July 31, 1934.  J. M. NASH  1,968,091
MACHINE FOR SHAPING BAR ENDS, AND WORK END FINISHING PURPOSES
Filed Feb. 13, 1931  9 Sheets-Sheet 1

Fig.1

Inventor
John M. Nash
By Wheeler, Wheeler & Wheeler
Attorneys

July 31, 1934.　　　　　J. M. NASH　　　　　1,968,091

MACHINE FOR SHAPING BAR ENDS, AND WORK END FINISHING PURPOSES

Filed Feb. 13, 1931　　　　9 Sheets-Sheet 2

Inventor
John M. Nash
By Wheeler, Wheeler & Wheeler
Attorneys

July 31, 1934. J. M. NASH 1,968,091
MACHINE FOR SHAPING BAR ENDS, AND WORK END FINISHING PURPOSES
Filed Feb. 13, 1931 9 Sheets-Sheet 3

Inventor
John M. Nash
By Wheeler, Wheeler & Wheeler
Attorneys

July 31, 1934. J. M. NASH 1,968,091
MACHINE FOR SHAPING BAR ENDS, AND WORK END FINISHING PURPOSES
Filed Feb. 13, 1931   9 Sheets-Sheet 6

Inventor
John M. Nash
By Wheeler, Wheeler & Wheeler
Attorneys

July 31, 1934.                J. M. NASH                1,968,091
    MACHINE FOR SHAPING BAR ENDS, AND WORK END FINISHING PURPOSES
                    Filed Feb. 13, 1931        9 Sheets-Sheet 7

Inventor
John M. Nash
By Wheeler, Wheeler & Wheeler
Attorneys

July 31, 1934.   J. M. NASH   1,968,091
MACHINE FOR SHAPING BAR ENDS, AND WORK END FINISHING PURPOSES
Filed Feb. 13, 1931   9 Sheets-Sheet 9

INVENTOR
John M. Nash
BY
Wheeler, Wheeler & Wheeler
ATTORNEYS

Patented July 31, 1934

1,968,091

UNITED STATES PATENT OFFICE 1,968,091

MACHINE FOR SHAPING BAR ENDS, AND WORK END FINISHING PURPOSES

John M. Nash, Wauwatosa, Wis.

Application February 13, 1931, Serial No. 515,454

39 Claims. (Cl. 144—35)

My invention relates to improvements in machines for shaping bar ends, and work end finishing purposes.

The primary object of my invention is to provide a machine for expediting operations upon the ends of bars, (ordinarily wooden bars), whereby the same may be successively cut and socketed at various angles or otherwise shaped by adjustable working tools while succeeding bars are being mechanically fed from a magazine to the receiving side of the machine.

More particularly stated, my object is to provide a machine in which bars or rods may be received in a magazine and automatically fed therefrom at stated intervals into the paths of cutting, boring or shaping tools, operable simultaneously at both ends of the work to cut, trim or bore at various angles, predetermined by the setting of the machine, and to deliver each completed piece from the machine as the next one comes into position for its final tooling operation. Also, to provide for independently adjustable tool carriers for operation upon the respective ends of the work.

Further objects are to provide means for accurately guiding the work in its passage through the machine and fixedly holding it during tooling operations; to provide means for adjusting the tool carriers to hold the tools with their axes either in a horizontal plane or at various angles above or below such plane; to provide means for handling work of varying dimensions within limits of variation ordinarily existent in articles of the type for which the machine is intended; to provide means, whereby bars may have both ends simultaneously bevelled by sawing them at the desired angles during one stage of operation and subsequently bored along lines perpendicular to the bevelled faces to provide sockets such as tenon receiving sockets, the axes of which are normal to said bevelled surfaces; and in general, to provide a machine which may be so adjusted preparatory to the performance of a given sequence of operations as to eliminate the necessity for manual control while such operations are being performed and for any period of time during which the work supplying magazine may be kept supplied with material.

A further object is to provide a machine of the above mentioned type which can be readily adjusted and adapted for operation upon bars of different shapes, lengths and thicknesses.

Figure 4:
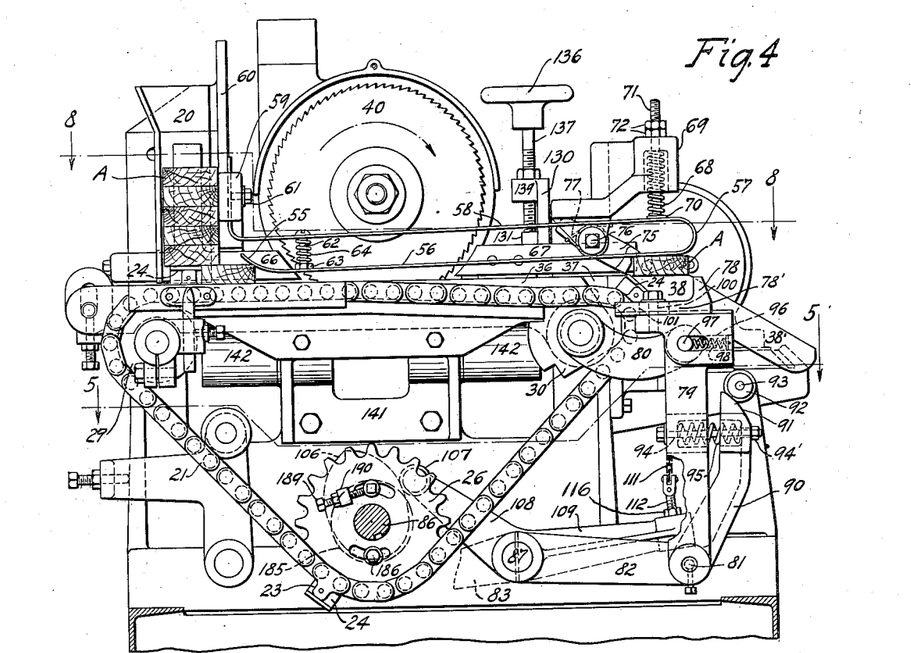
Figure 4 is a sectional view drawn to line 4—4 of Figure 2.

The machine illustrated in the drawings is designed particularly for sawing the ends of wooden bars, such as the bars A in the magazine pile shown in Figure 4, and providing them with tenon receiving sockets, the axes of which are each perpendicular to the plane in which the end is cut. When the bars are to be connected to form a frame, their ends may be sawed and bored obliquely, whereby the bars may be fitted together end to end at desired angles to form a frame, and whereby their oblique faces may be connected by suitable tenons inserted in the respective sockets. Such bars are ordinarily rectangular in cross section and their width, thickness and length will, of course, be determined by the character of the frame to be formed.

Preparatory to their delivery to the machine, the bars will be cut in lengths slightly in excess of the lengths of the finished bars, whereby they can be piled in a magazine 20 as indicated in Figure 4, and delivered therefrom successively by an endless carrier which conveys them along suitable track rails which support and guide the bars while they are being sawed to proper length and at the desired angle, (either square cut or beveled). Each successive bar is delivered by the carrier to suitable supports associated with clamping mechanism, and boring tools for holding it in proper positions while the tenon sockets are being bored after which it is automatically released to be delivered by the next bar as it is moved by the carrier into position for a boring operation. The mechanism for performing those operations, taken with the controlling mechanism and the means for adjusting the parts for handling stock of differing lengths, widths and thicknesses and differing work requirements, constitute the leading features of the machine.

Figure 1:
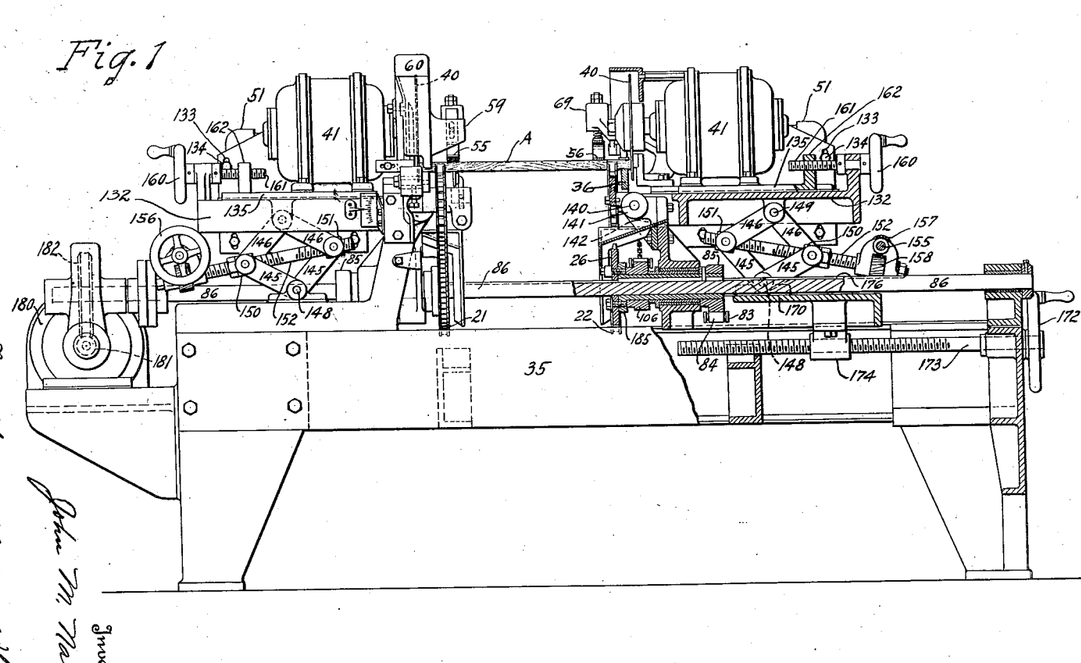
Figure 1 is a side elevation as seen from the infeeding side, with the electrical controls omitted and a portion of the right hand end broken away in vertical section.
Figure 2:
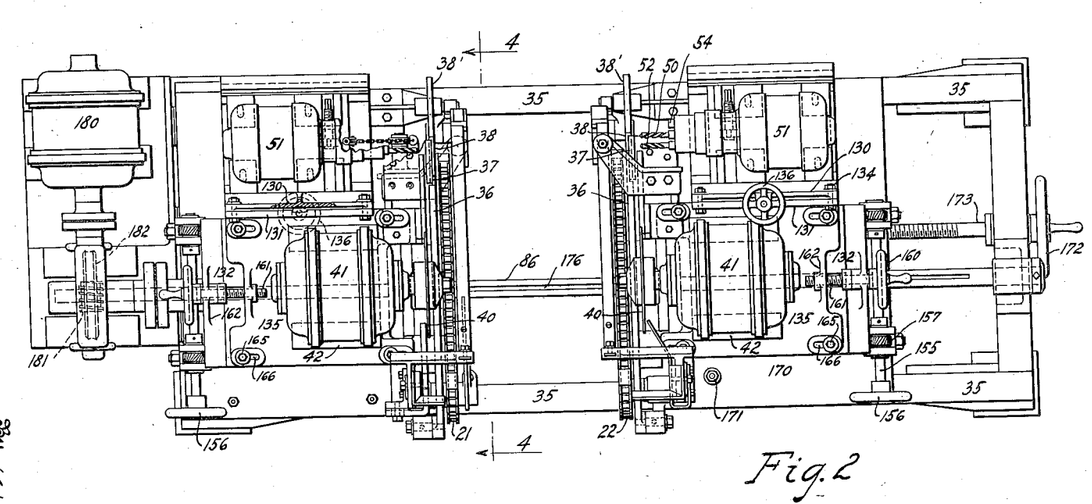
Figure 2 is a general plan view, with duplicate parts broken away or indicated in dotted lines at the left hand end.

Referring to Figures 1, 2 and 4 for a general understanding of the structure, it will be observed that the bars are placed with their ends engaged in three sided magazines 20 and are mechanically delivered therefrom by a set of chain belts 21 and 22 which are provided at suitable intervals with bar engaging projections which are adapted to engage and push the bottom bar from underneath the pile in the magazine. For this purpose the chains are preferably provided at intervals with what may be conveniently termed carrier links similar to the other links of the chain except that they have one or more outwardly extending lips 23 to which a feeding clip or follower plate 24 may be secured. This plate preferably has a flange pivoted to the carrier link projection 23 and so positioned as to engage the bar with its upper surface flush with that of the bar, as clearly shown at the left hand in Figure 4.

In the construction shown, there are two of these chains in position to engage the respective end portions of the work and for each chain there are three carrier links and follower plates. In Figure 4 one of them is shown as it appears when delivering a bar from the bottom of the magazine, another as it appears when withdrawing from a bar which has just been pushed into position for a boring operation, and the third is shown with its carrier link in engagement with the driving sprocket wheel 26. The work actuating portions of the chains are supported by arcuate guides 27 and 28, (Fig. 9) respectively flanked by side flanges 29 and 30. These guides may resemble pulleys, although they preferably do not rotate.

When delivered from the magazine by the chains the work is carried along the transverse feed-way above the main frame 35 with the ends of the work supported upon feed-way track members 36 and their extension track members 37 and 38, the latter having downwardly inclined outer end portions 38' to facilitate delivery of the work at the side of the machine upon completion of the operations now to be described. But the chains pass downwardly over the rear guides 28 and withdraw their follower plates from the work as the latter reaches the horizontal inner portions of the track members 38.

In the specific embodiment of my invention as shown in the drawings, the ends of the work are first cut by circular saws 40 driven individually by electric motors 41 and mounted upon tilting bed plates 42, whereby the saws may operate upon the work either in vertical planes or in oblique planes inclined in either direction from a vertical plane, the saws being located in proximity to the outer sides of the track rails 36 to which the work is held under resilient pressure as hereinafter described. The saws are rotated in the direction indicated by the arrow in Figure 4, whereby the saw pressure is exerted upon the work in the direction of the follower plates and in opposition to the direction in which the carrier chain moves along the track-way.

After the ends of the work have been trimmed by the saws it will have been cut to a length equal to the distance between the saws and the ends will have been faced in planes corresponding with those occupied by the saws, i. e. in oblique planes when the saws have been adjusted obliquely and in vertical planes when the saws have been adjusted vertically.

Figure 9:
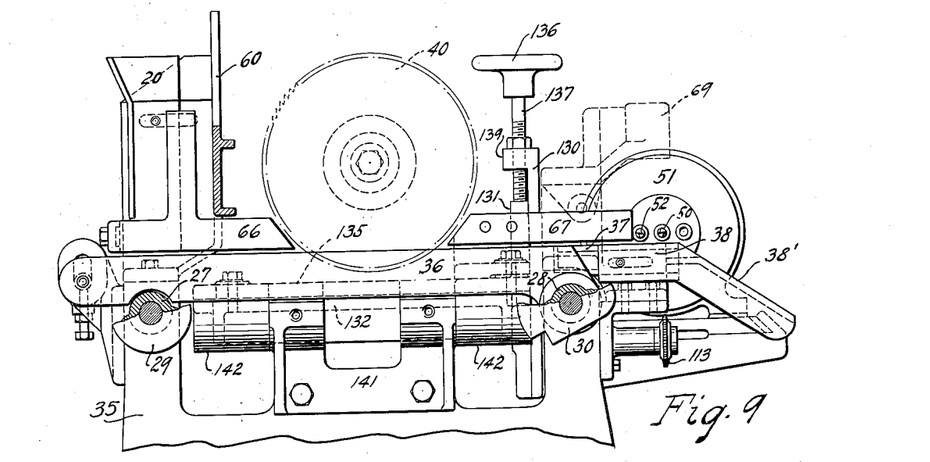
Figure 9 is a sectional view drawn to line 9—9 of Figure 8.
Figure 10:
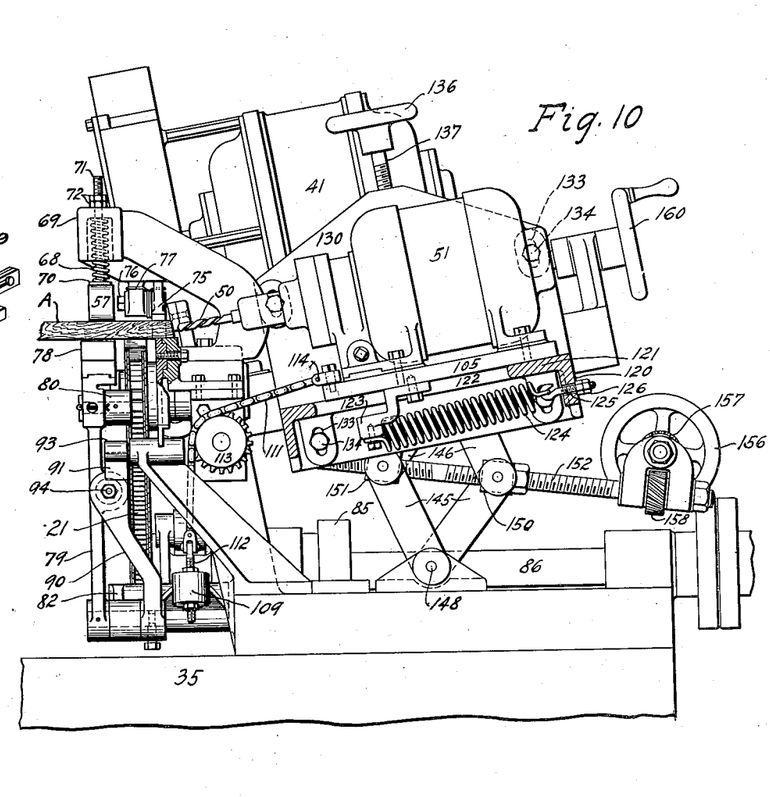
Figure 10 is a rear elevation of the left hand end portion shown in Figures 1 and 2 with the driving motor of the feed works omitted and saw tilted.
Figure 11:
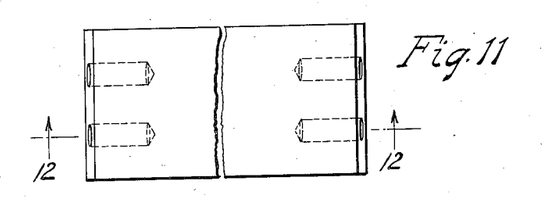
Figures 11 and 12 are fragmentary views of some of the work in plan and section, the section being taken to line 12—12 of Figure 11.
Figure 12:
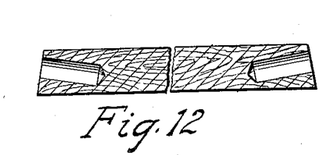

During these sawing operations the work will be moved by the chains at a speed which necessarily corresponds with the speed of the cutting operations, and the work is then carried by the chains and deposited in the path of the boring tools 50, each of which is individually driven by its motor 51. In the construction shown, two boring tools 50 and 52 are associated with each motor, the boring tool 52 being inter-geared with the driving shaft of the tool 50 as indicated by dotted lines at 53 in Figures 2 and 9. A third chuck is provided at 54 whereby three boring tools may be operated from a single motor if desired. These tools are thus geared for simultaneous operation along parallel lines in a common plane, although those associated with the other motor may be adjusted to operate in a different plane. Figures 1 and 2 show the saw and boring motors with their axes in horizontal planes, and Figure 10 shows the boring motor in a tilted position.

During the boring operation the work will be securely gripped and rigidly held at both ends, as hereinafter explained, and after the boring operation has been completed it will be released by the gripping devices and allowed to remain until the next piece of work moves into boring position, whereupon the completed work will be pushed to the inclined portions 38' of the track members 38 and discharged by gravity at the rear side of the machine. The means for holding the work upon the track-way during the sawing and boring operations will now be described.

Means are provided for applying resilient downward pressure to the work to hold the same to the track-way during the sawing operations (Fig. 4). In the construction illustrated the piece of work delivered by the chains from the bottom of the magazines has its end portions immediately carried underneath the upwardly curving extremities 55 of elongated presser bars 56 which are substantially parallel with the associated track-ways but inwardly and upwardly offset therefrom. These presser bars are preferably formed of resilient material supported for downward pressure upon the work. In the construction shown their rear ends are bent into an upwardly curving loop 57 from which a supporting arm 58 extends forwardly over the presser bar or arm 56 and is connected at its front end with a slotted bracket 59 which projects over the feed-way from the rear magazine walls 60. The socketed end of the presser bar or arm is adjustably secured by means of a set screw 61.

Cushioning means are interposed between the front ends of the upper and lower arms 56 and 58 of the presser bar and for this purpose I preferably employ a screw bolt 62 having its head above the upper arm 58 and a nut 63 at its lower end which bears upon the lower arm. A compression spring 64 coiled about this screw or bolt provides the necessary cushioning effect and the desired added pressure of the arm 56 upon the work to prevent it from lifting or vibrating upon the track-ways during the sawing operation. The work is prevented from shifting longitudinally by the saws and by end plates 66 and 67, the plates 66 being located between the magazines and the saws, and the plates 67 being located at the rear of the saws between them and the boring tools.

The rear ends of both arms 56 and 58 of the presser bar are resiliently re-enforced against upward movement by compression springs 68 socketed in frame brackets 69. The lower ends of the springs 68 are seated against bearing plates 70 which are in pressure engagement with the upper surface of the arm 58 of the presser bar. These bearing plates 70 constitute the heads of bolts 71 about which the springs 68 are coiled and these bolts each have lock nuts at 72 whereby the tension of the springs may be varied. Each bolt is adapted to slide in the bracket aperture through which it passes, whereby it allows the arms 56 and 58 to yield upwardly under increasing resilient pressure, as the springs 68 are compressed.

Figure 7:
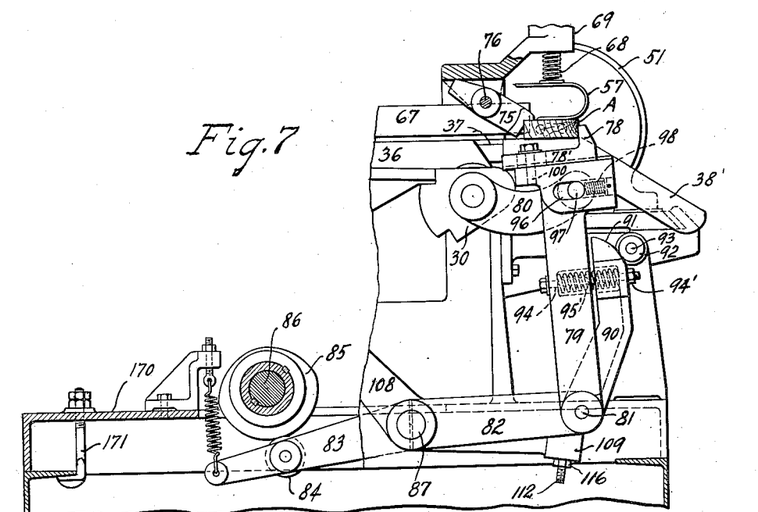
Figure 8:
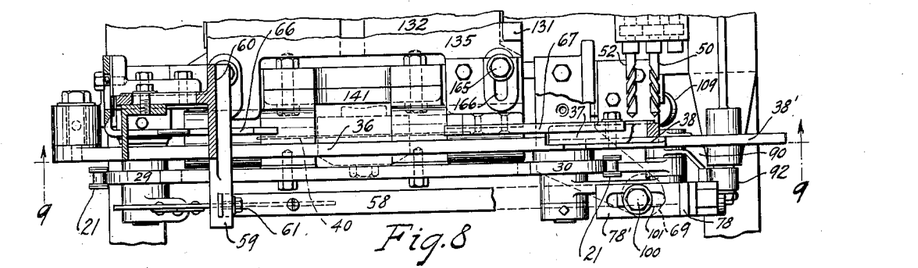
Figure 8 is a sectional view drawn generally to line 8—8 of Figure 4.

During the boring operations, additional means are employed to hold the work fixedly in position. Stop dogs 75 are pivoted to the frame or frame brackets 69 at 76 and springs 77 are coiled about their pivot axes and arranged to urge the rear ends of the dogs downwardly to the position in which one of the dogs is shown in Figure 4, the upper front corner of the work being engaged in a notch formed in the end of the dog for that purpose. (Figures 4 and 7.) The work cannot be shifted retractively along the track-way when the dogs are in this position.

Figure 5:
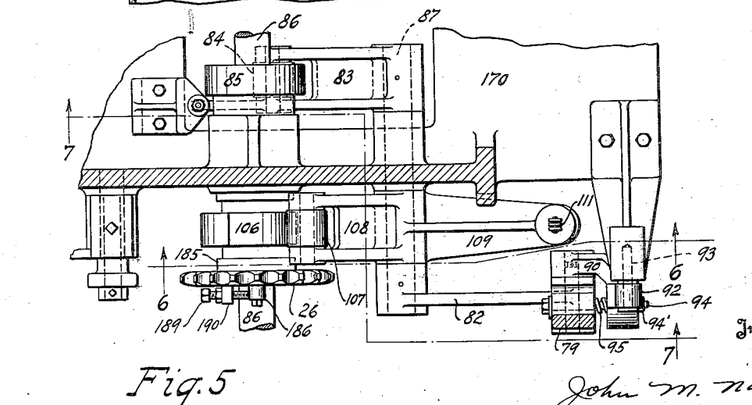
Figure 5 is a sectional view drawn to line 5—5 of Figure 4.

The work will then be pressed against the dogs by clamping jaws 78, each carried by an upwardly movable post 79, the upper portion or head of which is connected with the frame by a link 80, which also allows the upper end of the post to be swung forwardly and backwardly as hereinafter explained. The lower end of each post 79 is pivoted at 81 to the arm 82 of a bell crank having another arm 83 provided with a roller 84 in engagement with a rotary cam 85 carried by a shaft 86, which is also utilized to drive the chains 21 by means of the sprocket wheels 26, (Figures 4, 5, and 7).

Each of these bell cranks has an elongated fulcrum pin 87 which serves as a mounting for another bell crank hereinafter described and which is utilized to impart feed motion to the boring tools. When the post 79 is lifted by the cam 85 and associated bell crank, its upper end is also swung inwardly to cause the clamping jaw 78 to engage the rear margin of the work and press it fixedly against the dog 75. This may be conveniently accomplished by mounting an upwardly extending wedge arm 90 upon each pivot pin 81 and providing it with an obliquely faced upper end 91 for engagement with a roller 92 journaled to a frame stud 93, whereby, during upward movement of the post, it may be crowded inwardly toward the longitudinal center of the machine.

When the longer radius of the cam 85 bears upon the roller 84, the bell crank arm 83 will be depressed, (Figure 7), thereby lifting the post supporting arm 82, post 79 and the auxiliary arm 90. This lifting movement will initially carry the clamping jaws 78 into position for engaging the outer margin of the piece of work which has just been delivered by the carrier chains to the horizontal or receiving end portion of the track members 38.

Thereupon, the movement of the obliquely faced upper end of the wedge arm 90 upon the roller 92 causes the wedge arm to swing toward the post and this movement is transmitted to the post through a spring 95 coiled about the link bolt 94, the ends of the spring being socketed respectively in the post 79 and arm 90, and inward movement of the post is permitted by a slot 96 in the head of the post in which engages the connecting cross pin 97 carried by the link 80. A compression spring 98 is seated in the slot and tends to urge the upper end of the post rearwardly by pressure upon the cross pin 97, but this tendency is overcome by the stronger pressure of the spring 95 when the wedge arm 90 is moved toward the post by the roller 92.

The jaw member 78' is dove-tailed upon the upper surface of the post head and is adjustably clamped thereto by a set screw 100 passing through a slot 101 in the jaw slide member 78', as best shown in Figures 4 and 7. Therefore as the post head moves upwardly and inwardly, the jaw 78 will first move upwardly along the rear margin of the work and then swing forwardly toward the longitudinal center of the machine to clamp the work bar A between it and the dog 75. The arm 56, reinforced by the pressure of the coiled spring 68, exerts sufficient pressure upon the upper surface of the work to prevent it from being lifted from the track member 38 during this operation. This pressure also prevents the work from moving after it is released from the actuating chains, and before it has been clamped by the jaws 78.

Figure 6:
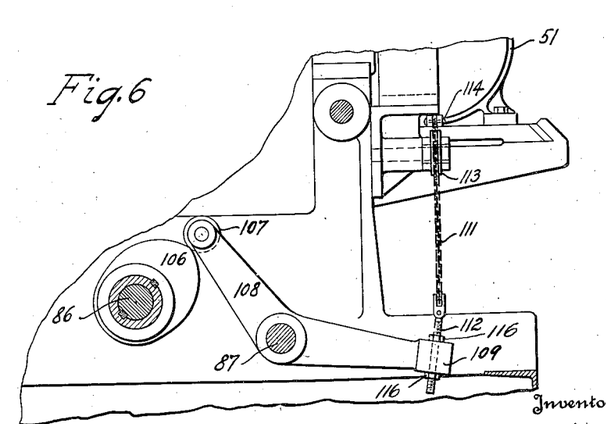
Figures 6 and 7 are detail sectional views of the work grippers and associated cams drawn respectively to lines 6—6 and 7—7 of Figure 5.

Immediately after the work has thus been clamped in position, the boring tool carriage slide 105, (Figure 10), will be actuated in a direction to carry the boring tools 50—52 into contact with the faced end of the work and the tools will then be progressively fed into the work by means of a cam 106, mounted on the shaft 86, as best shown in Figures 5 and 6, and which is adapted to transmit motion through the cam roller 107, carried by a bell crank which is fulcrumed upon shaft 87, and provided with a cam actuated forked arm 108, and a slide actuating arm 109. A chain 111 is adjustably connected with the arm 109 by a screw 112, the head of which is coupled to the chain. The chain passes over the sprocket wheel 113 and is connected to the slide 105 at 114.

The screw 112 is adjusted in the arm 109 after loosening the lock nuts 116, thereby regulating the depth of the bore by determining the initial position of the slide 105 with reference to the work.

The slide 105 is supported upon a carriage 120 which has a slide supporting platform 121 provided with a slot 122 through which a slide bracket 123 extends, with its lower end connected to a tension spring 124. The other end of the spring is connected with a screw hook 125 adjustably threaded to the end of the carriage and secured in the desired position of adjustment by a nut 126. The spring 124 allows the slide 105 to move along the platform 121 and carry the tools in the direction of the work at a rate determined by the curvature of the cam 106. But at the end of the tool feeding operation, the cam allows the slide 105 to be gradually retracted by the spring 124 until the tools (boring tools 50—52) have been wholly withdrawn from the work. The carriage is adjustable by means hereinafter to be described, whereby it may be positioned at various elevations and inclinations, determined by the character of the work to be performed. When work is to be performed as indicated in Figure 10, the inclination of the carriage is such that the boring tool 50 will be perpendicular to the inclined end face of the work.

From the foregoing description it will be understood that bars such as the bars A may be fed from the magazines and carried along the track-ways to the saws by means of the carrier chains, and progressively fed to the saws while the latter are cutting or trimming their ends in oblique planes, as illustrated in the drawings; the bars being thus cut at pre-determined lengths and delivered by the chains into position for the clamping and boring operations above described.

After the bars have been clamped and provided with tenon sockets by the boring tools 50 and 52 and after such tools have been withdrawn from the work and the clamping jaws 78 retracted, another piece of work may be delivered by the chains into the clamping position, and while approaching the clamping position, the second piece will lift the clamping dogs 75 and pass underneath them, this movement ceasing with the simultaneous retraction of the follower plates 24 and the downward movement of the dogs 75 to the holding position in which they are illustrated in Figure 4. In this movement the second piece of work will push the first to the inclined portions 38' of the rear track members 38. Thereupon the clamping and boring operations may be repeated upon the second piece of work.

In order to adapt the machine for operation upon work stock of different lengths, widths, thicknesses and shapes, and in order to also adapt the machine for operations which differ in character from those above described, a wide range of adjustability is necessary and it is also necessary to provide means whereby independent adjustments may be made at opposite sides of the feedway and also whereby certain identical adjustments may be made at opposite sides of the feedway in accordance with the requirements of the work to be done.

At the respective sides of the feedway the inner side wall 130 of what may be termed the boring tool carriage 120 is secured to an adjacent side wall 131 of the saw carriage which has a platform 132 (Figs. 1 and 3) from which the saw motor 41 is supported by a slide 135. One of these vertical walls 130—131 is provided with vertical slots 133 through which the clamping bolts 134 may pass (Fig. 10). These slots 133 allow a relative adjustment of the boring tool and saw carriages in a plane perpendicular to the carriage platforms whereby the boring tool motor and boring tools may be relatively raised or lowered in accordance with the requirements for boring stock of different thicknesses. It will be obvious that if bars are being fed into the machine which are of greater thickness than the bars A shown in the drawings, it will be desirable to form the tenon sockets at a higher level and therefore the boring carriage will be raised relatively to the saw carriage by loosening the bolts 134, raising the boring carriage, and again clamping it in position to the saw carriage wall 130.

The adjusting screw 112 will then be reset to either maintain the same field of tool field movement or to provide a different field of movement if the character of the work requires it. During any vertical adjustment of the platform, the combined effect of the tension spring 124 and of the chain 111 and associated parts, tends to produce a shifting of the platform 105 forwardly or backwardly. This will change the field in which the tool feeding movements take place unless the screw 112 is given a compensating adjustment. The length of the new work, as well as its thickness, will, of course, determine the nature of the adjustment to be made of the screw 112.

Figure 3:
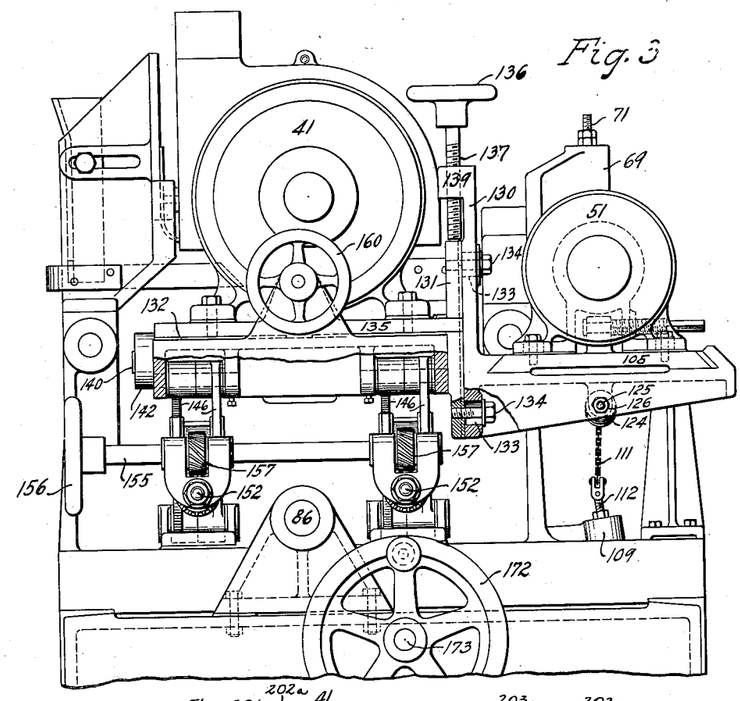
Figure 3 is a right hand end elevation of the upper portion.

This adjustment of the boring carriage is facilitated by operating the hand wheel 136 to turn the adjusting screw 137 (Figures 3 and 10). The lower end of the adjusting screw 137 bears upon or has a swiveled connection with the saw carriage wall 131 and has threaded engagement in a flange 139 projecting inwardly from the boring carriage wall 130, as best shown in Figure 9. Therefore when the clamping bolts 134 are loosened, the wall 130, with the associated boring carriage and motor, may be raised or lowered to the desired extent by the screw 137, and again secured by means of the clamping bolts 134.

At each side of the feedway the saw carriage and boring carriage may be simultaneously tilted to change the pitch or angle at which the stock is to be cut and bored. To accomplish this, the margin of the saw carriage nearest to and parallel to the feedway is hinged to the frame, the frame being provided with a transverse shaft or hinge pin 140, supported by a frame bracket 141 which extends along the central portion of said margin. The saw carriage has hinge butts or brackets 142 which receive the pin 140. The saw carriage and the connected boring carriage may therefore be adjustably tilted as will now be explained.

The outer portion of the saw carriage is supported from the frame by toggle links 145 and 146 in so-called lazy-tongs assembly, the links being arranged in pairs, with the lower ends of the links 145 pivoted to the frame at 148 and the upper ends of the links 146 pivoted to the saw carriage at 149, as best shown in Figure 1. Their meeting ends are pivoted to interposed feed nut blocks 150 and 151 in which right and left screw threads on the adjusting screws 152 have respective engagement. For each saw carriage there are two sets of links and associated adjusting screws 152 and they are simultaneously actuated by a transverse screw 155 which is operated from the side of the machine by a hand wheel 156 provided with worm threads 157, meshing with the worm wheels 158 on the respective screws 152.

It will, of course, be understood that when the screws 152 are turned in a direction to carry the feed nuts 150 and 151 toward each other, the links will raise the rear end of the saw carriage to swing the same in a vertical plane about the axis of hinge pin 140. An opposite rotation of the screw will lower the rear end of the saw carriage. The boring carriage will be correspondingly actuated because of its connection with the saw carriage as above explained. Inasmuch as the saw and boring tool carriages at opposite sides of the feedway may be independently adjusted, the respective ends of the work may be beveled and socketed in opposite directions and at different angles.

To vary the relative longitudinal positions of the saws and boring tools, the saw slides 135 may be adjusted longitudinally of the machine on their carriage platforms 132 by means of the hand wheels 160 and associated screws 161, the latter having threaded engagement in the upturned flanges 162 at the outer ends of the slides 135. When the slides are adjusted to their proper positions they may be rigidly secured to their platforms 132 by set screws 165, (Figure 2). The slides 135 are provided with slots 166 to receive these set screws.

Also at one end of the machine, i. e., the right hand end in Figures 1 and 2, the entire saw and boring tool assembly may be adjusted as a unit longitudinally of the frame 35 in order to vary the distance between the saws in accordance with the requirements imposed by the length of the work. To accomplish this, the saw and boring tool assembly is mounted upon a platform 170, (Figure 2), normally secured to the frame by one or more clamping screw hooks 171 but the platform is adjustable along said main frame 35 by means of the hand wheel 172, associated screw 173 and a bracket 174 (Fig. 1) in which said screw 173 is threaded, this bracket being connected with the platform 170.

The feed chain driving shaft 86 is provided with an elongated key-way 176, whereby in all positions of adjustment the driving sprocket 26 of the associated feed chain 21 may be continuously engaged with the shaft. This shaft is driven by a motor 180 located at the other end of the machine. The motor shaft is provided with a worm 181 which drives a worm wheel 182 connected with the shaft 86 as best shown in Figure 1.

The stroke, or field of movement, of the boring tools may be varied by adjusting the screws 112 which connect the feed chains 111 with their associated bell cranks.

Also, a timing adjustment may be obtained by rotatively adjusting the driving sprocket wheels 26 upon the shaft 86, the sprocket wheels being secured to the shaft flange 185 by clamping bolts 186 extending through the arcuate sprocket wheel slots 187. This adjustment is facilitated by an adjusting screw 189 threaded in a sprocket wheel bracket 190 (Fig. 4).

Figure 13:
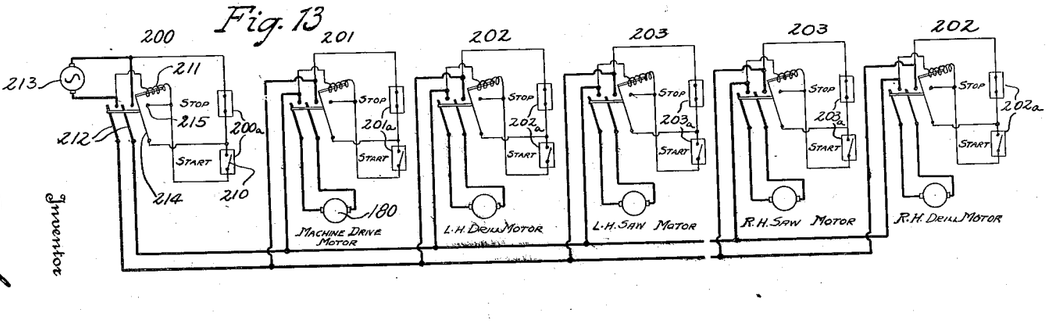
Figure 13 is a diagram of the electrical controls.
Figure 14:
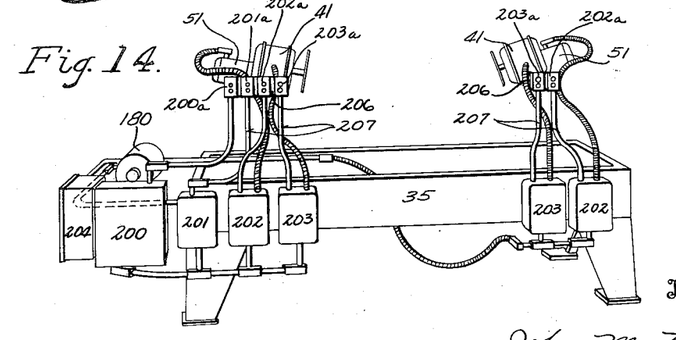
Figure 14 is a conventional side view showing the location of the switch boxes and switch controlling push buttons with reference to the frame and motors.

The operation of the machine may be electrically controlled as indicated in Figures 13 and 14. The switch mechanism is located in suitable switch boxes secured to the side of the machine frame as shown in Figure 14.

A master switch is located in the box 200, and a switch for the feed motor 180 is located in the box 201. Switches controlling the motors for the boring tools or drills are located in the boxes 202 and those controlling the saw motors are located in the boxes 203. Overload relays or cutouts such as are ordinarily employed for similar machinery may be located in the box 204.

The operation of the switches is controlled by sets of push buttons 200a, 201a, 202a and 203a, these switches being located for convenience in front of the saw tables and at about the same elevation. They are mounted upon control boards or mountings 206, which may be carried by the conduits 207. It is not deemed necessary to explain the switch mechanism in detail since any well known type of switch having push button control through a solenoid or electro-magnet in a shunt circuit may be employed. The following description is therefore confined to the relation of the switches to the working parts of the machine.

When starting the machine, it is first necessary to actuate the lower push button of the set 200a. This closes the switch indicated at 210 in Fig. 13 to energize the solenoid 211, and close the master switch arms 212 which connect up all of the motor circuits and associated switch operating shunt circuits with a source of electrical energy indicated at 213. The switch arm 214 when actuated by the solenoid, swings to contact 215 and shunts starting button while simultaneously closing the master switch elements 212.

Thereupon the lower push button of the sets 202a and 203a will be pushed in to start the saw motors and boring tool or drill motors 41 and 51. If the operator should neglect to start the saw motors 41 before the first piece of work is fed to the saws by the motor 180 the machine will be stopped by the overload relays as soon as the work is brought into contact with the stationary saws. Saw motors and drill motors cannot be started until they have been connected up with the source of power by the master switch mechanism located in the box 200, but their starting push buttons should be pushed in before starting the feed motor. After starting the saw and drill motors the lower push button of the set 201a will be pushed in to start the feed motor 180.

It will be observed in Figure 13 that the organization of the switch mechanism in the various switch boxes is the same as above described with reference to the master switch except that the shunt circuit of the master switch is normally connected directly with the source of energy by its starting push button whereas the others are only connected therewith through the previously closed master switch.

In the modified form of construction illustrated in Figures 15 to 18 inclusive, the saw and drill mountings are supported upon a bed block 220. This supports a longitudinally movable slide 221 which carries a cross slide 222 having a superposed turn table 223. The turn table 223 is mounted for oscillatory adjustment about the axis of the shaft 224 and is locked in the desired position of adjustment by a bolt 225 which projects upwardly from the slide 222 through an arcuate slot 226 in the turn table.

Figure 15:
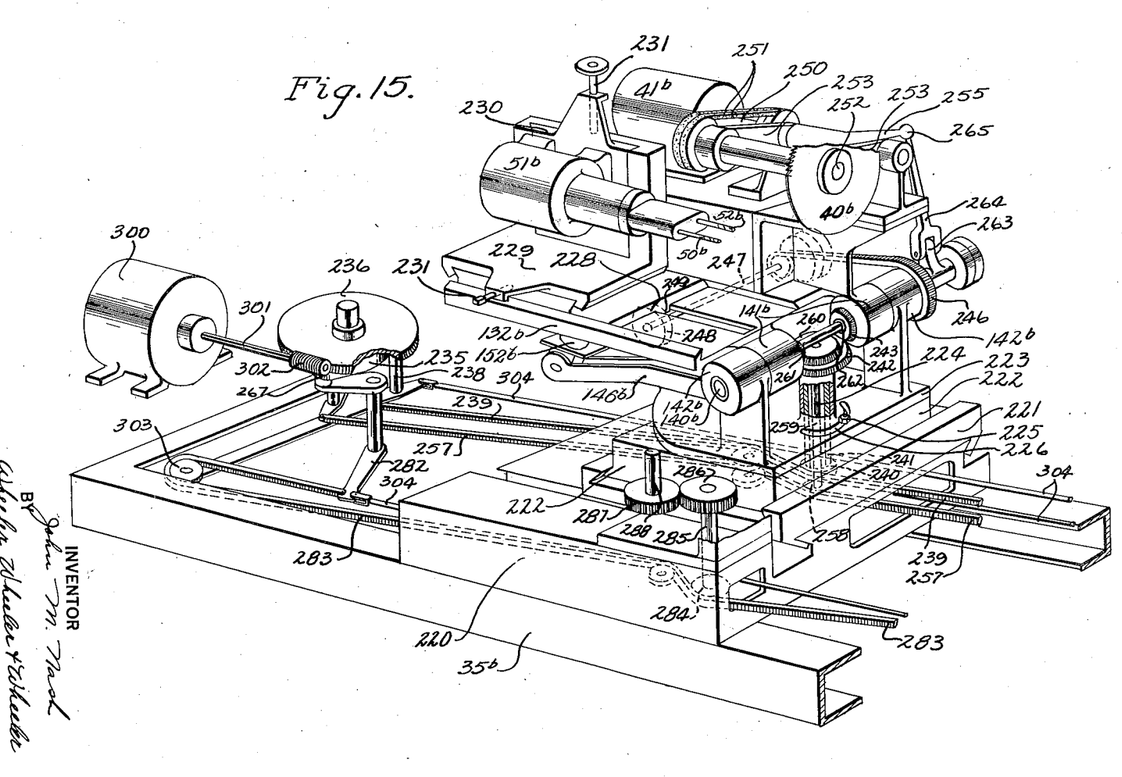
Figure 15 is a perspective view of the left hand end portion of a modified table and slide structure, with associated parts.

It will be understood that Figure 15 illustrates only the left end half portion of the mahine and that the right hand portion will correspond with the portion illustrated in substantially the same manner that the right hand portion of the machine illustrated in Figure 1 corresponds with the left hand portion, there being an intermediate feedway space of variable width above the main frame, whereby work of differing lengths may be simultaneously sawed and bored at both ends.

A tilting saw table 132b, which may also serve as a drill supporting table, is hinged to the turn table at 141b for tilting adjustment about the axis of the shaft 140b journaled in the turn table bearing members 142b. Arms 146b extend from the turn table underneath the tilting table 132b and support jack screws indicated at 152b, whereby the tilting table may be lifted or lowered in a swinging movement about the axis of its hinged connection with the turn table.

The drill or boring motor 51b is mounted in front of the saw motor 41b and is supported from the tilting table 132b by the longitudinal drill motor slide 228, cross slide 229, and vertical slide 230, whereby all of the adjustments of the feed motion of the drill motors and drills as heretofore described may be made in this modified structure. It will, of course, be understood that the slides 229 and 230 will be secured by set screws or clamping bolts 231 in their proper positions, and the slide 228 will be actuated to feed the drills into the work during a boring operation.

Figure 18:
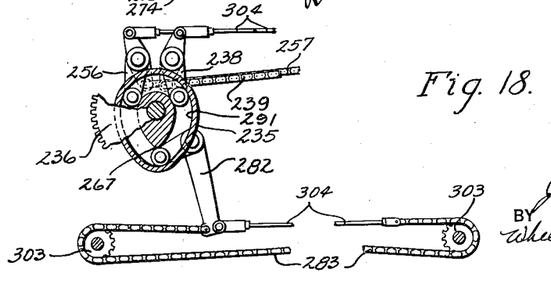
Figure 18 is a fragmentary plan view of the cam and associated parts for adjusting the saws and feeding the drills into the work in the Figure 15 structure.

This feed motion is preferably derived from the cam 235 shown in Figure 18, which cam is rotated by means of a gear wheel 236 to transmit motion to the drill slide 228 through the lever 238, chain 239, pulley 240, vertical sleeve 241, bevelled gear 242, pinion 243, sleeve 262, roller chain 246 with associated pulleys, shaft 247, pinion 248, and rack 249, the latter being secured to the under side of the tool feeding slide 228.

The saws 40b will be driven from their respective motors 41b through the motor shaft 250, belts 251 and associated pulleys, and a saw arbor 252 supported by arms 253 in a position to allow the saws to be swung across the line of feed of the tools 50b and 52b for a sawing operation while said tools are retracted, the saws then being raised by an upwardly swinging movement of the arms 253 which carries the saws out of the path of the drills. This swinging movement of the arms 253 which support each saw arbor is derived from a lever arm 255 which is reciprocated by the cam 235, shown in Figure 18, through the lever 256, chain 257, sprocket wheel 258, shaft 259, bevelled gear wheel 260, pinion 261, shaft 140b, arm 263, and link 264, the upper end of which is connected with the lever 255 at 265. The movements of the drill feed slide 228 and of the saw supporting arms 252 are timed by the cam 235 in such a manner that the high point 267 on the cam will actuate the lever 256 to swing the saw downwardly into a position for operation upon the work and then retract the saw during the initial infeeding movement of the slide 228, the saw being wholly retracted in time to allow the drills to reach the work.

The reciprocation of the arms 253 which support the saw arbor occurs during an interval substantially equal to that required for a one-third turn of the cam. The reciprocation of the drill slide occurs during a time interval substantially equal to the next third turn of the cam, and during the remaining third turn of the cam the drills and saws will be held in a retracted position, the portions of the cam then in engagement with the levers 238 and 256 being concentric with the cam axis. During this period of dwell for the saws and drills, the work will be fed from the magazine 20b (Figures 16 and 17) by means now to be described.

The bottom piece of work is fed from the magazine by the work feeding slide 270, which has a shoulder 271 which engages said bottom piece to push it from under the pile in the magazine. This slide 270 is mounted upon a carrying slide 272 but has independent limited longitudinal movement thereon, being connected with the carrying slide by bolts 273 which extend through slots 274 in the slide 270. A compression spring 275 has its outer end in engagement with a seating 276 which projects upwardly from the carrying slide through a slot 277 (Figure 17) in the slide 270, the other end of the spring being seated against the end of the slot, whereby it tends to urge the slide 270 in the direction of the work to the limit of its independent movement permitted by the bolts 273. The purpose of this independent movement is to allow the carrying slide to complete its stroke after the feeding slide 270 has delivered the work into a position for sawing and boring operations.

The carrying slide 272 is provided with a rack 280 along its outer side, whereby this slide may be actuated from the cam 235 (Figure 18) through the bell crank 282, chain 283, sprocket wheel 284 (Figure 16), shaft 285, gear wheels 286 and 287, shaft 288, and gear wheels 289 and 290, the latter having teeth in mesh with the teeth of the rack 280.

It will be understood from the illustration in Figure 18 that the levers 238, 256 and 282 each have a roller which travels in the cam groove 291, whereby the levers may be actuated by the cam in two directions. The purpose of the continued movement of the carrying slide 272, after delivery of the work, will now be explained.

Figures 16, 17:
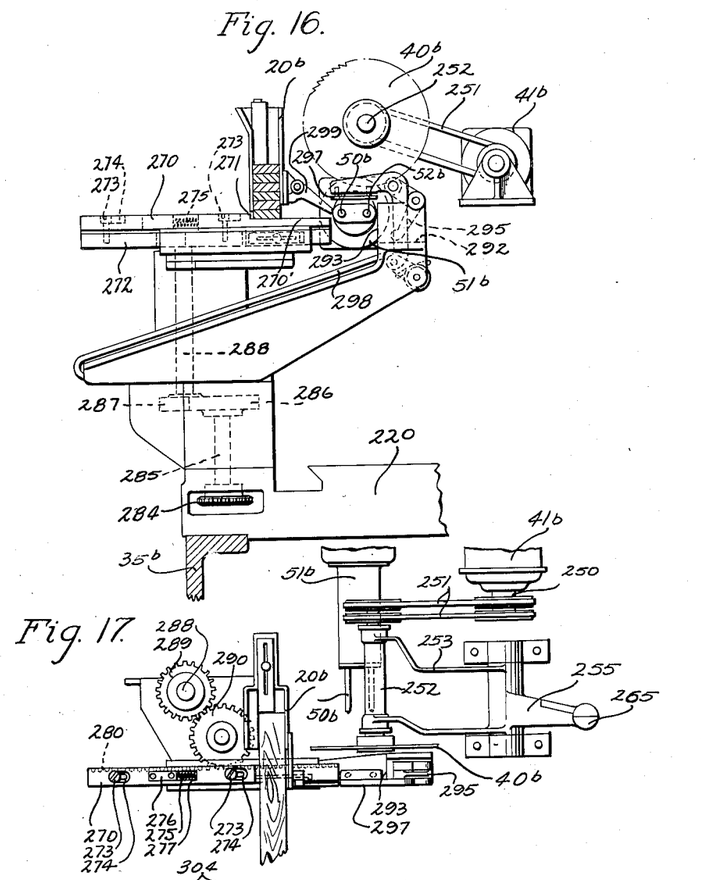
Figure 16 is an elevation of the left hand portions of a modified feed mechanism adapted particularly for use with the structure shown in Figure 15.
Figure 17 is a plan view of the parts shown in Figure 16.

It will be observed in Figure 16 that the frame is provided with a bearing surface 292 over which the rear end of the carrying slide 272 travels when approaching the limit of its feeding stroke. At the beginning of this final movement the work will have been brought against a shoulder stop 293, the work being then held between such stop and the pushing shoulder 271 on the feed slide 270. The movement of the feed slide is thus necessarily checked but the carrier slide continues to move against the downwardly projecting arm of a bell crank 295 provided with a yielding clamping plate 297, which moves downwardly upon the work when the lower arm of the bell crank 295 is pushed rearwardly by the carrier slide 272. The work is thus securely clamped to the reduced end portion 270' of the feeding slide 270, and this clamping movement is completed before the sawing operation begins. Thereupon the arcuate portion of the cam will hold the bell crank 282 for a period of dwell pending the sawing and boring operations, after which a retractive movement will begin which will be completed when the high point of the cam is in registry with the power receiving arm of the bell crank 282. During this retractive movement the slides 270 and 272 will be withdrawn from underneath the work. The work will be held by the dog 299 against retraction and therefore it will drop upon the incline 298, by which it is delivered to the machine at the front side thereof.

With the above described construction it is possible to not only tilt the saws and boring tools by adjustment of their tables in a vertical plane about the axis of the hinge pin 140b, but the turn table provides means whereby the saw and boring tools may be swung about the vertical axis of the shaft 224 which serves as a king bolt for the turn table. Therefore, the ends of the work may be cut in a vertical plane or bevelled in a plane oblique to both the vertical and horizontal planes, or if desired, the ends of the work may be cut in a plane which is oblique to a vertical transverse plane of the machine.

The cam 235 is actuated from a motor 300 through the motor shaft 301, worm gear 302, worm wheel 236, the cam being secured to the under side of the worm wheel. The chains are passed around pulleys 303 at the opposite end of the machine and are connected with link rods 304 for retraction during the retractive movements of the cam actuated levers, to which the link rods are pivoted.

Figure 19:
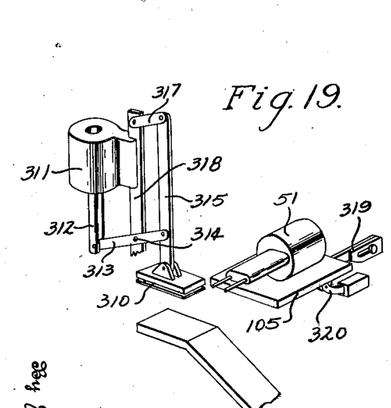
Figure 19 illustrates a modified work clamping device which may be substituted for the work clamping mechanism illustrated in the other views.

As a substitute for either of the work clamping mechanisms heretofore described, I may employ an electrically operated clamp. One form of such a clamp is illustrated in Figure 19, in which a clamping plate 310 is pressed down upon the work by a solenoid 311, the core piece of which is connected by a rod 312 with a lever 313 fulcrumed at 314 and pivoted to a push bar 315, the lower end of which is secured to the clamping plate and guided by a link 317 connected to a fixed support at 318.

The drill slide is provided with a shoe 319 to actuate a switch arm 320 and close the circuit of the solenoid at the proper time. When the solenoid is deenergized, upon retraction of the drill slide, the clamping plate is lifted by the weight of the solenoid plunger.

I am aware of the fact that combined saw trimming and boring machines have heretofore been constructed which were provided with independently actuated work carrying and saw carrying slides, movable during operation in accordance with the requirements of the work, and in some of which boring tools were provided which could be manually actuated independently. In such machines precision is dependent upon the skill of the operator, whereas in my improved machine the movements of the saws and boring tools for operation upon the work at opposite sides of the feedway are derived from a common source of power, and therefore the pressure of drills or boring tools upon the work is equalized so that there is no tendency to shift the work upon the carrier.

To make this practical for different classes of work, for example, bars of differing thickness, I have added means for independently adjusting the level at which the boring tools may operate, and this adjustment may be manually performed without otherwise changing the positions of the boring tools on either side of the feedway relatively to their associated saw. In this adjustment each boring tool of any given set receives exactly the same adjustment that the other tools receive, and therefore each tool in a set retains its relationship to the associated saw in all other particulars. I thus eliminate the possibiltiy that a manual adjustment might be carelessly made in such a manner as to produce a defective product. Any manually performed tilting adjustment of one of the saws produces a like tilting adjustment of the associated boring tools, since the supports are interlocked.

The movements of the carrier chains and the feeding movements of the boring tools or drills on both sides of the feedway are derived from a common source of power, viz.—the shaft 86, and are therefore precisely actuated in timed relation to each other, and the timing is not affected when the crank wheel 172 is actuated to change the width of the feedway.

I claim:

1. A precision machine for shaping bar ends, comprising the combination of mechanical means for feeding bars along a feedway while holding them in transverse positions with reference to the line of travel, saw and boring tool supports, each mounted for adjustment about pivotal axes parallel to the feedway, saws mounted upon certain of said supports and boring tools mounted upon other of said supports, each saw and boring tool being in position for operation upon the ends of said bars at the respective sides of the feedway, and means for transmitting equal feeding movements to tools on opposite sides of the feedway, said supports on each side of the feedway being normally interlocked in fixed relation to each other, and said boring tool supports being perpendicularly adjustable with reference to the saw supports while maintaining the interlocking relation to prevent relative change of position in any other particular.

2. A machine for shaping bar ends comprising the combination of a feed way, means for feeding bars along said feed way, saws and boring tools disposed along the feed way, and means for clamping each bar in a fixed position in registry with an associated boring tool pending a boring operation, said saws and boring tools being mounted upon movable supports interlocked for simultaneous tilting adjustment to position the saws in different planes and to effect a corresponding adjustment of the boring tools to maintain the axes in substantial parallelism with the saw-arbors.

3. A precision machine for finishing the ends of bars of different lengths and thicknesses, comprising the combination with mechanical means for feeding bars in a regular order of succession along a feedway, of sets of platforms disposed along the sides of said feedway, mechanical means for simultaneously tilting each set in equal degree about axes parallel with the line of travel of the work along the feedway, independent power units on each of the platforms, saws connected with oppositely disposed power units in position for trimming the ends of the work, boring tools connected with other oppositely disposed power units, and common means for moving the boring tool platform simultaneously for tool feeding movements while otherwise maintaining the tools in the same relation to the saws.

4. A work end finishing machine, comprising the combination of a work supporting feed way provided with a work carrier adapted to convey individual pieces of work along the feed way, sets of tools and tool driving motors mounted upon tiltable platforms along the sides of the feed way, adjusting means for varying the relative positions of said platforms, and adjusting means for tilting the platforms simultaneously and to an equal extent, said tools including facing tools adapted to operate upon work in motion along said feed way and boring tools positioned for operation upon work delivered by the work carrier, said boring tools having power driven infeeding mechanism and associated work clamping devices.

5. A work end finishing machine comprising the combination of a work supporting feed way having a magazine at one end and work clamping devices at the other, adjustable platforms at the sides of the feed way, provided with motor driven circular saws positioned for operation upon pieces of work moving along the feed way, conveying means for delivering work from the magazine, actuating the work during sawing operations thereon and delivering such work to said clamping devices, motor driven boring mechanism adapted for operation upon work engaged by said clamping devices, and associated power driven means for actuating the clamping devices.

6. A work end finishing machine including the combination with work supporting and conveying means, of a set of tiltingly adjustable saw supporting platforms flanking the supporting and conveying means, a set of mechanically actuated work clamping devices at the delivery end of the conveying means, supports for boring mechanism associated with the saw platforms for corresponding tilting adjustments, and power driven boring mechanism carried thereby in position for registry of boring tools with the clamped work along lines substantially parallel with the associated saw arbor.

7. A work end finishing macine comprising the combination with a supporting frame, of a pair of platforms mounted thereon and relatively adjustable to provide a work feeding space of variable width between the platforms, motor supporting platforms in hinged connection with the first mentioned platforms along the sides of said feed way, feed screw means for tilting said platforms about their respective hinge axes, slides mounted upon said platforms and adjustable thereon transversely of the hinge axes, tool driving motors mounted upon the slides in positions for supporting tools for operation upon work in the feed way, and cooperating tools, adjustable in correspondence with the adjustments of said platforms, and adapted for operation upon the work substantially at right angles to the planes in which the first mentioned tools operate.

8. A work end finishing machine comprising the combination with a supporting frame, of a pair of platforms mounted thereon and relatively adjustable to provide a work feeding space of variable width between the platforms, motor supporting platforms in hinged connection with the first mentioned platforms along the sides of said feed way, feed screw means for tilting said platforms about their respective hinge axes, slides mounted upon said platforms and adjustable thereon transversely of the hinge axes, tool driving motors mounted upon the slides in positions for supporting tools for operation upon work in the feed way, said feed way having work supporting tracks and parallel work conveying chains adapted to move the work across the frame between the tools, independently mounted tools and associated driving motors connected with said platforms for simultaneous tilting adjustment and adapted for operation upon the work transversely with reference to the first mentioned tools.

9. A work end finishing machine comprising the combination with a supporting frame, of a pair of platforms mounted thereon and relatively adjustable to provide a work feeding space of variable width between the platforms, motor supporting platforms in hinged connection with the first mentioned platforms along the sides of said feed way, feed screw means for tilting said platforms about their respective hinge axes, slides mounted upon said platforms and adjustable thereon transversely of the hinge axes, and tool driving motors mounted upon the slides in position for supporting tools for operation upon work in the feed way, one set of slides being provided with power actuated feeding mechanism for progressively feeding tools into the work to a predetermined extent and then retracting them to permit delivery of the work.

10. In a machine of the described class, the combination with a pair of tilting platforms relatively adjustable at right angles to the upper surfaces of the platforms, means for securing the platforms together in different positions of such adjustment, a circular saw and associated driving motor supported from one of the platforms, motor driven boring mechanism mounted to slide upon the other platform along a line substantially parallel to the saw arbor, a spring normally holding the boring mechanism in retracted position, cam actuated connections for moving the boring mechanism in the opposite direction, means for feeding work to the saw for a sawing operation, and clamping means adapted to receive the work from the feeding means and hold it rigidly in the path of boring tools carried by the boring mechanism.

11. In a machine of the described class, the combination with means for supporting a pile of bars, of a set of conveying chains provided with bar engaging members adapted to deliver the bars singly along a feed way, a pair of bar supporting tracks at the sides of said feed way, resilient arms mounted above the tracks and positioned substantially parallel thereto for holding the bars to the tracks resilient means for progressively increasing the pressure of said work upon the bars adjacent the rear ends of the tracks, means for sawing end portions of bars projecting across said tracks and underneath said resilient arms, and boring mechanism adapted to support boring tools for operation along lines parallel to the saw arbor and to feed them into work delivered by said conveyor chain.

12. In a machine of the described class, the combination with means for supoprting a pile of bars, of a set of conveying chains provided with bar engaging members adapted to deliver the bars singly along a feed way, a pair of bar supporting tracks at the sides of said feed way, resilient arms mounted above the tracks and positioned substantially parallel thereto for holding the bars to the tracks, means for sawing end portions of bars projecting across said tracks and underneath said resilient arms, boring mechanism adapted to support boring tools for operation along lines parallel to the saw arbor and to feed them into work delivered by said conveyor chain, and power driven clamping mechanism co-operative with said resilient arms for holding the work rigidly during boring operations.

13. In a machine of the described class, the combination with power driven boring mechanism, of a set of work supporting track members, an associated set of work engaging clamping members, one adapted to drop by gravity into engagement with one margin of the work and the other being adapted to be lifted and pressed into engagement with the opposing margin of the work, a pivoted supporting post for the last mentioned clamping member, a cam actuated lever for lifting said post, a cam arm, and associated, relatively stationary, roller for swinging the lifted post to carry its clamp into engagement with the work.

14. In a machine of the described class, a set of work supporting tracks, associated endless conveyor chains provided with work engaging projections at intervals, driving sprockets engaging the chains on the return side and having a common driving shaft, means for supporting work pieces in superposed relation, with the bottom piece in the path of said projections at the receiving ends of the tracks, means for supporting the work feeding portion of the chain along lines substantially parallel to the tracks, work clamping devices for engaging the delivered work, cams on the shaft and connections for transmitting motion therefrom to the clamping devices in timed relation to the delivery of the work by said chains.

15. In a machine of the described class, a set of work supporting tracks, associated endless conveyor chains provided with work engaging projections at intervals, driving sprockets engaging the chains on the return side and having a common driving shaft, means for supporting work pieces in superposed relation, with the bottom piece in the path of said projections at the receiving ends of the tracks, means for supporting the work feeding portion of the chain along lines substantially parallel to the tracks, said driving sprockets being rotatively adjustable upon the shaft to time the movement of the work engaging projections relatively and with reference to the desired time of work delivery, and one of said sprockets being also longitudinally movable along the shaft.

16. In a machine of the described class, a set of sawing and boring mechanisms mounted side by side upon tables hingedly supported along one margin, slides mounted upon said tables for supporting the respective mechanisms, means for adjusting one of the tables in a plane perpendicular to the table surfaces, means for clamping the tables together upon completion of such adjustment, and means for swinging the tables upon their hinges.

17. In a machine of the described class, the combination of a set of variably spaced track ways, work conveying elements movable along the inner sides of the track ways, extension track way members disposed beyond the delivery ends of the conveying means, spring actuated pivoted stops adapted to engage the rear margins of work delivered to the track way extensions, and clamping members adapted to be lifted and swung into engagement with the opposing margins of the work to clamp the same against said pivoted stops, the work conveying elements being adapted to push the work underneath the pivoted stops to a position where such stops may drop into engagement with its rear margins.

18. In a machine of the described class, the combination, of a work conveyor, means for trimming the ends of the work while moved by the conveyor, supports adapted to receive the work from the conveyor in a position of approximate registry for a machine operation, a presser bar extending over said supports and underneath which the work may be pushed by the conveyor during delivery, a stop latch adapted to drop across the path of the delivered work, and a work clamp having operating mechanism timed with the conveyor for clamping the work against the stop latch.

19. In a machine of the described class, a set of work conveyor chains each having adjustable work pushing links at intervals, and a driving sprocket wheel on its return side, a driving shaft to which the sprocket wheels are secured, work engaging clamps at the delivery ends of the conveyors operatively connected with said driving shaft for operation at intervals determined by the spacing of said pushing links, and means for rotatively adjusting the toothed portions of the sprocket wheels for timing the operation of said links upon the work.

20. In a machine of the described class, the combination with a tiltable table adapted to support saw and drill motors, of a table supporting bed, a main slide thereon, a cross slide on the main slide, and a turn table carried by the cross slide and to which the tilting table is hinged.

21. In a machine of the described class, the combination with a tiltable table adapted to support saw and drill motors, of a table supporting bed, a main slide thereon, a cross slide on the main slide, and a turn table carried by the cross slide and to which the tilting table is hinged, said turn table being provided with a lifting jack for swinging the tilting table upon its hinged connection.

22. In a machine of the described class, the combination with a tiltable table, a saw motor and saw carried thereby, a drill motor supported from the table by a plurality of slides, one adjustable transversely of the tilitng axis and constituting a feed slide, one mounted on the feed slide and adjustable along a line parallel to said tilting axis, and one vertically adjustable upon the second slide and provided with a drill motor having drills positioned for operation upon the work by movement of the feed slide subsequent to a sawing operation.

23. In a machine of the described class, the combination with a tiltable table, a saw motor carried thereby, a feed slide adjustable on the table transversely of the tilting axis, a superposed slide adjustable on the feed slide along a line parallel to said axis, a vertically adjustable slide connected therewith, a drill motor secured to the vertically adjustable slide and mechanical means for positioning said slides.

24. In a machine of the described class, the combination with a tiltable table saw motor and saw carried thereby, of a feed slide adjustable on the table transversely of the tilting axis, a superposed slide adjustable along a line parallel to said axis, a vertically adjustable tool carrying slide connected therewith, adjusting screws for positioning each of said slides, and means for actuating the feed slide to feed tools into the work after sawing operations.

25. In a machine of the described class, the combination with a saw motor having a saw driving shaft and a saw arbor movable in an arc about said motor shaft, and pivotally connected therewith by supporting arms, power driven means periodically swinging the arms to carry the saw into and out of contact with the work, a drill, and co-operating means for moving the drill into and out of contact with the work across the path of the saw when the latter is retracted by its supporting arms.

26. In a machine of the described class, the combination with a saw motor having a saw driving shaft and a saw arbor movable in an arc about said motor shaft, and pivotally connected therewith by supporting arms, power driven means periodically swinging the arms to carry the saw into and out of contact with the work, a drill, and co-operating means for moving the drill into and out of contact with the work across the path of the saw when the latter is retracted by its supporting arms, said power driven means including a cam for imparting timed feeding movements to the saw and drill, the saw and drill being provided with independent driving motors.

27. In a machine of the described class, the combination with work supporting magazine members, of a feeding mechanism including a work feeding slide, a carrier slide capable of limited independent movement, and a work holding clamp adapted to be actuated by the carrying slide during its independent movement.

28. In a machine of the described class, the combination with means for supporting work pieces in superposed relation, a reciprocatory work feeding slide having a shoulder portion adapted to engage the bottom piece of work and push the same from underneath the other pieces, a reciprocatory carrier slide yieldingly connected with the feed slide and adapted for limited independent movement at the end of the feeding stroke, and a work clamp having a clamp actuating member in the path of the carrier slide when the latter is moved independently of the feeding slide.

29. In a machine of the described class, the combination with means for supporting work pieces in superposed relation, a reciprocatory work feeding slide having a shoulder portion adapted to engage the bottom piece of work and push the same from underneath the other pieces, a reciprocatory carrier slide yieldingly connected with the feed slide and adapted for limited independent movement at the end of the feeding stroke, a work clamp having a clamp actuating member in the path of the carrier slide when the latter is moved independently of the feeding slide, and a stop for limiting the movement of the work and the feed slide preparatory to the independent movement of the carrier slide, said stop being adapted to hold the work in a position to be engaged with the work clamp.

30. In a machine of the described class, the combination with means for supporting a pile of work pieces, a clamping plate adapted to be moved into engagement with work delivered from said pile, a work feeder adapted to convey pieces of work from the pile into registry with the clamping plate and to support it for a clamping operation thereon, a delivery chute down which the work may travel when unsupported by the feeding means, means for retracting the feeding means from the work after a predetermined clamping interval for permitting machine operation, and means for preventing a retraction of the work with the feeding means, whereby the work will be permitted to drop into said chute.

31. In a machine of the described class, the combination with means for continuously conveying and delivering pieces of work successively at predetermined intervals, of a set of gripping devices for temporarily holding a delivered piece of work pending delivery of the next piece, trimming saws associated with the conveyor for simultaneously facing the work, boring tools associated with the gripping devices and positioned for operation upon the sawed faces of the work while held by the gripping devices, and means for simultaneously adjusting the saws in different planes and automatically transmitting motion to the boring tools for a corresponding adjustment thereof, whereby their axes may be maintained substantially perpendicular to the sawed faces of the work.

32. In a machine of the described class, the combination with an adjustably tiltable platform provided with work trimming mechanism adapted to operate upon the work in various planes determined by the adjustment of the platform and an associated platform adjustably tiltable about the same axial line, said platforms being normally connected for simultaneous and corresponding tilting movement, and means for adjusting the connection between the platforms to vary their relative positions with reference to each other.

33. In a machine of the described class, the combination with work feeding mechanism, of a set of adjustable platforms disposed at one side of the work feeding mechanism and normally connected for simultaneous adjusting movements, sawing mechanism carried by one of the platforms and boring mechanism carried by the other platform and adapted to support boring tools in position for operation upon surfaces of work prepared by the sawing mechanism, and means for independently adjusting the connections between said platforms to vary the position of the boring mechanism with reference to the sawing mechanism.

34. In a machine of the described class, the combination of a set of work supporting trackways, conveying means for periodically moving work along the trackways, means for facing the ends of the work while it is being advanced along the trackways, stop dogs pivotally supported above the trackways with their rear ends loaded and adapted to automatically drop into position for engagement with the rear side of a piece of delivered work, timed power driven clamping devices adapted to clamp such work against the stop dogs, a set of tools positioned for operation upon the ends of work clamped against said stop dogs, and timed power driven means for feeding such tools into the ends of the clamped work and retracting them upon completion of a predetermined infeeding movement.

35. In a machine of the described class, the combination of a set of work supporting trackways, means for conveying pieces of work successively along said trackways, a set of tools for operating upon work in motion along said trackways, a second set of tools for operating upon work at rest after delivery by said conveying means, timed frictional presser means for holding the work to the trackways while it is being advanced by the conveying means and stopping its motion at the delivery end of the conveying means, power driven clamping devices for engaging the delivered work and timed power driven infeeding devices for moving the second set of tools into those faces of the work which were prepared by the first mentioned tools and while the work is held to the trackways by the frictional presser means.

36. In a machine of the described class, the combination of a set of work supporting trackways and associated conveying means for moving work along said trackways, resiliently yielding presser bars adapted to hold the work to the trackways while it is advanced by the conveying means and after delivery by the conveying means, a set of stop dogs normally in the path of the work and adapted to be temporarily lifted by the work as it passes thereunder, timed clamping devices co-operative with the presser bars and stop dogs for fixedly holding the delivered work for a predetermined period of time, trimming tools for facing the ends of the work while it is being advanced by the conveying means, boring tools for boring the faced ends of the work while it is being held by the clamping devices, and timed infeeding and outfeeding means for actuating the boring tools during the clamping interval.

37. In a machine of the described class, the combination with work trimming devices, of means for successively delivering pieces of work to the trimming devices for trimming operations at timed intervals, automatically acting stop dogs for preventing retractive movement of the work after delivery from the trimming devices, said stop dogs being adapted to yield under pressure of the work while advancing to clamping positions, power driven means for clamping the work against said stop dogs, and power driven means for feeding boring tools into the trimmed faces of the work and retracting them during said intervals.

38. A precision machine for finishing the ends of bars, comprising mechanical means for feeding bars in a regular order of succession along a feedway, in combination with sets of platforms disposed with one set at each side of the feedway and pivoted along their inner margins substantially in a vertical plane through the path traversed by the ends of the bars and with their pivotal axes aligned, mechanical means for simultaneously tilting the platforms of each set in equal degree about their pivotal axes, a saw carried by one of the platforms of each set in position for trimming the ends of the work, boring tools carried by the associated platform in position for boring the trimmed ends of the work, and means for normally locking the platforms of each set together for equal tilting movement, whereby the boring tools may be kept precisely perpendicular to the plane in which the saws operate.

39. A precision machine for shaping bar ends comprising the combination with mechanical means for feeding and positioning bars successively for saw trimming and boring operations, a set of saw and boring tool supports normally interlocked and manually adjustable as a unit at various angles in vertical and horizontal planes with reference to the work, mechanical means for bringing the work into contact with a saw and associated boring tools successively for face trimming the work at the desired angle and boring perpendicularly into the trimmed faces, means for independently adjusting the boring tool support at different levels with reference to the saw support, and means for constantly maintaining the said supports in the same relation to each other in all other respects.

JOHN M. NASH.